Oct. 27, 1953    A. A. KAUL    2,657,089
WEATHER SHIELD FOR AUTOMOBILE WINDOWS
Filed March 10, 1952
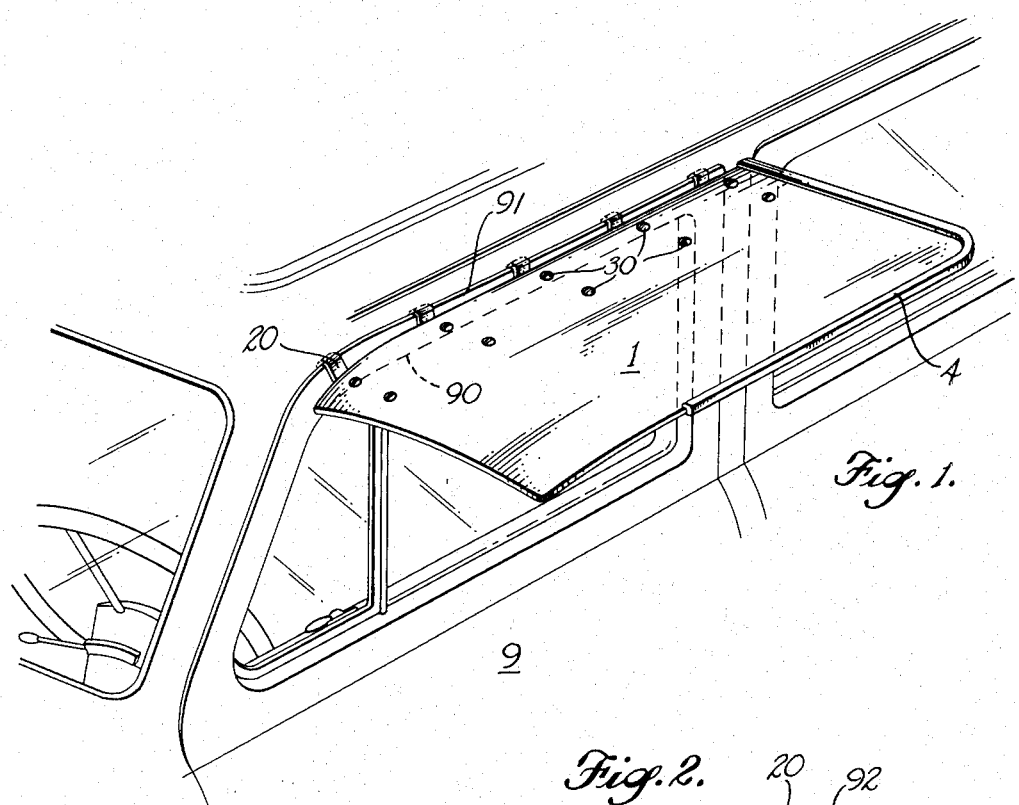
Fig. 1.
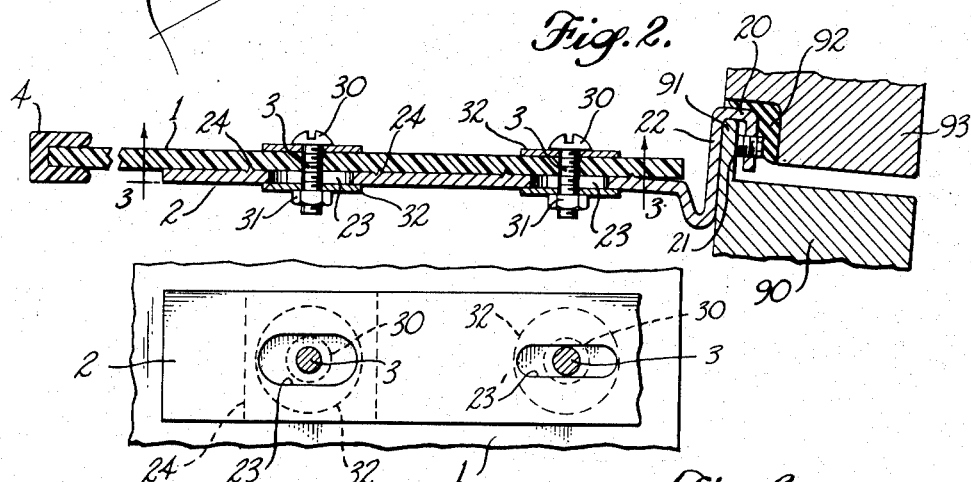
Fig. 2.
Fig. 3.
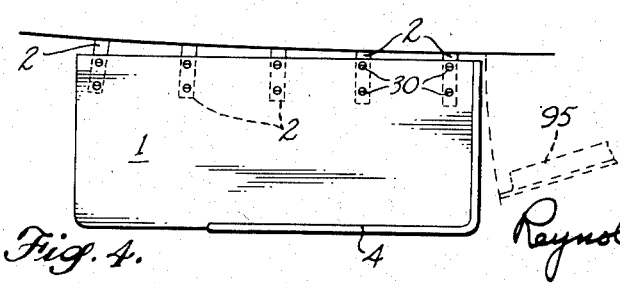
Fig. 4.
INVENTOR.
ARTHUR A. KAUL
BY
Reynolds, Beach + Christensen
ATTORNEYS Patented Oct. 27, 1953

2,657,089

UNITED STATES PATENT OFFICE 2,657,089

WEATHER SHIELD FOR AUTOMOBILE WINDOWS

Arthur A. Kaul, Chehalis, Wash.

Application March 10, 1952, Serial No. 275,753

2 Claims. (Cl. 296—44)

The present invention relates to a weather shield for attachment to automobiles, and particularly to the doors thereof, for the purpose of guarding the driver or other person sitting alongside the door and its window from the weather. The present shield has been devised primarily to guard against the sun, but will be useful also as a guard against rain.

Weather shields of this general type are known, and an example is represented in the patent to Hay, No. 2,034,342 of March 17, 1936. Such shields are subject to the relative wind, and must be strongly made and mounted. Always heretofore, so far as I can ascertain, such shields have been of a construction such that they must be manufactured to fit one or a small range of doors, or makes or models of car, or else they must be custom-fitted to each individual car. In either case they are expensive, and it is difficult for a dealer to maintain a stock adequate to possible demands. It is a primary object of the present invention to provide such a weather shield which is constructed of standard or stock materials and in such manner that with a minimum or no special provisions or custom fitting a shield can be fitted to any make or model of car, and will fit each such car smoothly and tightly, and may be held securely to the car notwithstanding that it is exposed to the relative wind while the car is moving forward.

It is particularly an object of the present invention to provide such a weather shield having the advantages already indicated, which may be made of a few relatively inexpensive components readily available, and easily fitted to any car and to each other, and which, when once assembled, may be relied on to stay securely in the adjusted position.

It is a further object to provide such a shield made primarily of a material which is somewhat stiff, yet having a certain degree of flexibility, may be readily reinforced at such points and in such manner as may be necessary to prevent it from vibrating or flapping in the relative wind as the car moves forward.

With these and other such objects in mind, as will appear more fully hereinafter, my invention comprises the novel weather shield for an automobile door which is shown in the accompanying drawings in a presently preferred form, and as will be described in this specification and more fully defined in the claims which terminate the same.

In the accompanying drawings the invention is shown applied to a typical car door, and in a typical form of construction, although it will be evident that the principles of the invention are applicable to somewhat modified forms of construction and to various makes and models of car.

Figure 1 is an isometric view, from above and forward, of such a weather shield applied to the front door of a typical sedan body.

Figure 2 is a transverse sectional view through the door's top rail, its soffit, and the shield mounted in operative position upon the car door.

Figure 3 is an underside plan view of a detail of the invention, as shown at 3—3 in Figure 2.

Figure 4 is a top plan view, on a reduced scale, of the weather shield in its mounted position with relation to a car door.

The automobile illustrated in Figures 1 and 4 is a sedan type, having both front and rear doors, but the invention is applicable also to a two-door type, or coupe. The door 9 is formed with a top rail 90, which forms part of the framing of the window opening, and it is almost universally the case that such top rails include additionally an upstanding flange 91, at the rear surface of which is mounted a sealing strip 92 which, when the door is closed, contacts the soffit 93 to seal the opening against the entrance of water and against drafts. Viewed in plan, as represented in Figure 4, such doors and their flanges 91 are generally curved, and this plan curvature is one of the factors which makes it difficult to fit a weather shield to a door without custom fitting or, conversely, which makes it difficult to provide a weather shield which is applicable to the doors of various makes and models, since they have different plan curvatures.

The weather shield according to the present invention is formed of a sheet 1 of material which has a considerable degree of stiffness, and which yet may be called flexible to some degree, but primarily it should be cuttable with a knife or with shears. There is available commercially a cellulose acetate sheet which is not expensive, and which is otherwise admirably suited for the purpose. Such sheet need not be in excess of one-sixteenth inch in thickness. While it is stiff, it is sufficiently flexible that it may be bent slightly, and particularly in a direction transverse to its plane, to conform to any desired curvature. It can be readily cut with a knife or with shears to round off corners, or to shape its outer edge, or to make it conform along one edge, if desired, to a curved surface against which it is to be pressed, in this instance to conform to the plan curvature of the door if that be considered necessary. In most cases it is not. The sheet may be of translucent material or of opaque material, and comes in colors to suit the taste of the user or to match the car's finish. Preferably it is of such nature as to cut off at least certain of the sun's rays, either the heat rays or the light rays, or both. Of course, if such a shield is to be used primarily or solely for the purpose of shielding against rain, then it would be better made of transparent material, and such transparent acetate sheets may be obtained at least as readily as the colored sheets.

Such a sheet, then, of a selected standard width, say ten or twelve inches, and of indefinite length, is readily cut to any desired length to fit the particular car and door. In a typical shield it is approximately twenty-six inches long and fits the top rail of a single door. If, however, the automobile is of the coupe type, and has only two doors, one on each side, the shield sheet or strip may be longer and may extend to the rear of the door, whereas if the automobile is of the four-door sedan type any such rearward extension of the weather shield would cause interference upon opening the rear door; see Figure 4.

The strip described is supported with its one edge alongside the top rail 90 of the automobile door, and the strip as a whole is directed thence generally laterally outwardly. As has already been indicated, if any unusually tight fit is desired, the inner edge of the strip may be cut with shears or with a knife to conform closely to the plan curvature of the top rail or its flange 91. Usually that will not be found necessary.

In order to support the strip in the disposition indicated, I employ a plurality of clips, each generally indicated at 2. Each clip at one end is formed with a hook 20 (see Figure 2), which fits snugly over the door's upstanding flange 91. It is not required that these hooks be a tight frictional fit, since screw means, as indicated at 21, may be employed to clamp them to the inner surface of the flange. The sponge rubber sealing strip 92 between the door frame and the door's flange will yield to afford space for the hook and its clamping screw at each clip's location. By the use of such a hook at 20, and including the downwardly directed portion 22 thereof, each clip may be secured upon the door's flange, projecting generally laterally outwardly therefrom at whatever angle of inclination (or none) that may be preferred, and by reason of a provision shortly to be explained, the interconnection between each clip and the sheet does not preclude varying this angle of inclination of individual clips. The clips 2 being made of metal strap, they may be bent as desired so as to support the sheet 1 level or at any slope that may be desired.

Before describing the means to connect the clips and the sheet or strip 1, consider the relationship in position of the several clips spaced along the flange 91 with relation to one another. Some such clips may project directly laterally outwardly, whereas others, as they follow the plan curvature of the flange 91, will be directed forwardly as well as outwardly. This is indicated by comparison of the positions of the several clips in Figure 4. Because of this the clips are not initially secured tightly to the sheet 1, but are at first applied loosely to the sheet, so that when they are applied to the door their direction is controlled more by the plan curvature of the door than by any other factor.

Holes have been preformed at intervals close to the inner edge of the strip 1, and the clips are located, preferably beneath the sheet, in general consonance with the location of these holes, but their location is not governed strictly thereby. In these holes are received studs 3, and these studs also pass through holes 23 or 23' in the clips 2, as see Figures 2 and 3. The inner holes 23' are made oversize longitudinally at least, but preferably not also laterally, but the outer holes 23, and especially those in the forward clip or two, and normally in all of them, are made appreciably oversize both longitudinally and laterally, so that the studs, which have been located by the holes formed in the strip 1, may pass through the holes 23 regardless of any slight skewing or other displacement of a clip from exact spacing or disposition relative to the other clips. The arrangement is shown in Figure 3, and the advantage of so doing is particularly illustrated in Figure 4. By providing the studs with head-like elements at their opposite ends, as for instance with the integral head 30 at top and the threaded nut 31 below, and by the employment of washers as 32, the clip and the sheet may be readily clamped together by the studs 3 in whatever disposition the clips may assume when the clips, and the sheet connected thereto, are applied to the door's flange.

It is preferred that each clip be provided with means which project into the clip-engaging surface of the sheet 1, and to this end, and in the preferable form, such projecting elements are formed as serrations 24, which when the clip and sheet are clamped together, dig into the under surface of the sheet 1 and thereby hold the clip and sheet firmly together in the positions of initial adjustment. Since the sheet is readily cuttable, such serrations or equivalent elements will readily dig into the sheet, and yet will hold firmly. The forward clip, as is seen in Figure 1, may even be in a different plane from the remainder of the clips, and when thus clamped to the sheet 1 may bend the sheet's forward edge downwardly as Figure 1 shows, but this is immaterial, and the sheet is flexible to an extent to permit this.

It is preferred that the clips do not extend the entire width of the sheet 1, and it has been found that an acetate sheet of the nature indicated above is sufficiently stiff that it will not droop unduly when the automobile is at rest. It is, however, sufficiently flexible that it may tend to flap in the relative wind as the automobile goes forward, and to guard against this, and to add some stiffness to the sheet, a reinforcement, such for example as the stiffening channel 4, of metal or of extruded plastic, for example, may be cut to the length desired and fitted around the rear outer corner of the sheet 1 and may extend to the inner edge of the sheet, if desired. It has been found that it is not necessary to extend it the entire length of the outer edge of the sheet.

By the provision of a shield of this nature, the occupant of the automobile may be guarded against sun or rain, or both, and the shield is formed of readily available materials, readily cut to the correct length for any particular car, and requiring little more in the way of fitting. Once the clips are installed in approximately the correct positions and then are clamped to the cut strip, the shield is complete and in place, and nothing further need be done except perhaps to add the stiffening reinforcement at 4.

As has been stated heretofore, if the body design is a four-door type, care must be taken to stop the rear end of the shield far enough forwardly to avoid interference with the rear door 95 and its arc of swing, as Figure 4 shows, but if the body type has only one door on a side, and that is hinged at its forward edge, the shield may extend as far rearwardly, within reason, as the user may desire.

If an extremely close fit is desired at the inner edge of the strip 1, it may be cut away to fit closely the contour of the door's top rail. It is preferred that this be done by cutting rather than to attempt to bend the strip around laterally, for the latter attempt is likely to cause it to buckle at some central point, and thus to be somewhat unsightly. Other than this there is no drawback to such lateral bending, and, indeed, the buckling may in some cases be considered an advantage in that it tends to stiffen the sheet and make it more nearly self-supporting.

I claim as my invention:

1. A weather shield for an automobile door such as is formed with an upstanding flange across its top rail, said sun shield comprising a stiff sheet of cuttable material, of a length approximating that of the door's top rail, and of lesser width, for disposition with one of its longer edges alongside the top rail, and generally projecting thence laterally, a plurality of elongated, laterally directed clips for mounting said sheet in such disposition, and spaced one from another along the door's top rail, each clip having at its inner end a hook for snug engagement over the door's upstanding flange, to support the clip in position laterally projecting from such flange, studs received in and spaced along the inner edge of the sheet, and passing through the laterally projecting portions of the respective clips, the clips being formed with an inner and an outer stud-receiving aperture, of which the inner aperture is oversize only lengthwise of the clip, and the outer is oversize both lengthwise and transversely of the clip, to enable divergence of such clips from parallelism with others, to accommodate curvature of the door's flange as seen in plan view, and means on the upper and lower ends of the studs constituting heads to clamp between them the clip and the sheet.

2. A weather shield for an automobile door such as is formed with an upstanding flange across its top rail, said sun shield comprising a stiff sheet of cuttable material, of a length approximating that of the door's top rail, and of lesser width, for disposition with one of its longer edges alongside the top rail, and generally projecting thence laterally, a plurality of elongated, laterally directed clips for mounting said sheet in such disposition, and spaced one from another along the door's top rail, each clip having at its inner end a hook for snug engagement over the door's upstanding flange, to support the clip in position laterally projecting from such flange, studs received in and spaced along the inner edge of the sheet, and passing through the laterally projecting portions of the respective clips, the clips being each formed with two stud-receiving apertures, one such aperture in the forward clip being oversize transversely of the clip, to permit its canting for forward and outward divergence relative to more rearwardly located clips, and means on the upper and lower ends of the studs constituting heads to clamp between them the clip and the sheet.

ARTHUR A. KAUL.

References Cited in the file of this patent

UNITED STATES PATENTS

| Number | Name | Date |
|---|---|---|
| 320,592 | Sandvos | June 23, 1885 |
| 2,034,342 | Hay | Mar. 17, 1936 |
| 2,564,800 | Bates | Aug. 21, 1951 |
| 2,575,660 | Geidl | Nov. 20, 1951 |